(12) United States Patent
Oyabu

(10) Patent No.: US 6,350,378 B1
(45) Date of Patent: Feb. 26, 2002

(54) WATER QUALITY IMPROVER

(75) Inventor: Toshiharu Oyabu, Nagoya (JP)

(73) Assignee: I.B.E.Co., Ltd., Aichi (JP)

( * ) Notice: Subject to any disclaimer, the term of this patent is extended or adjusted under 35 U.S.C. 154(b) by 0 days.

(21) Appl. No.: 09/601,154

(22) PCT Filed: Jan. 22, 1999

(86) PCT No.: PCT/JP99/00290

§ 371 Date: Jul. 27, 2000

§ 102(e) Date: Jul. 27, 2000

(87) PCT Pub. No.: WO99/37583

PCT Pub. Date: Jul. 29, 1999

(30) Foreign Application Priority Data

Jan. 27, 1998 (JP) .......................................... 10-030660
May 29, 1998 (JP) .......................................... 10-149112

(51) Int. Cl.⁷ .............................. C02F 1/70; C02F 1/68; B01D 24/12
(52) U.S. Cl. .................... 210/198.1; 210/749; 210/757; 210/758; 210/136; 210/280; 210/282; 210/287; 210/449; 239/428.5; 239/462; 239/553
(58) Field of Search ............................... 210/136, 749, 210/757, 198.1, 758, 280, 282, 284, 287, 449, 506; 239/428.5, 462, 553

(56) References Cited

U.S. PATENT DOCUMENTS 2,624,559 A * 1/1953 Hyde
3,827,636 A * 8/1974 Parkison et al.
4,322,292 A * 3/1982 Knox

FOREIGN PATENT DOCUMENTS

JP 02-290287 A * 11/1990
JP 03-242286 A * 10/1991
JP 07-284642 A * 10/1995

* cited by examiner

Primary Examiner—Thomas M. Lithgow
(74) Attorney, Agent, or Firm—Cooper & Dunham LLP; Donald S. Dowden

(57) ABSTRACT

The object of the present invention is to easily produce water having fine clusters and containing little chlorinated material. Said object is attained by a water treating apparatus consisting of a cylindrical body having a water inlet at the upper end and a water outlet at the lower end wherein a water passage is longitudinally formed in said cylindrical body, and a blade member is arranged in said cylindrical body and gives water passing through said water passage revolution force and shear force.

14 Claims, 7 Drawing Sheets

WATER QUALITY IMPROVER

FIELD OF THE INVENTION

The present invention relates to a water treating apparatus attached to the faucet of the water pipe to improve water quality.

DESCRIPTION OF THE PRIOR ART

The taste or bioactivity of water seems to be much effected by the sizes of clusters of water. The smaller sizes of clusters of water seem to result in better taste and bigger bioactivity of water because water having smaller-sized clusters is easily absorbed in plants or animals.

Hitherto, it is difficult to artificially produce water having small-sized clusters and one must get water having small-sized clusters from natural water.

SUMMARY OF THE INVENTION

Accordingly, an object of the present invention is to artificially produce water having small-sized clusters. Said object can be attained by a water treating apparatus consisting of a cylindrical body having a water inlet at the upper end and a water outlet at the lower end wherein a water passage is longitudinally formed in said cylindrical body, and a blade member is arranged in said cylindrical body and gives water passing through in said water passage revolution force and shear force.

To improve quality of city water containing chlorinated material, it is preferable to arrange a ceramic filling layer in said water passage and preferably said ceramic filling layer consists of a large number of ceramic balls treated with a ferric-ferrous iron to remove said chlorinated material.

Further to make foams in treated water, a partition is formed under the blade member and a nozzle is attached from the center of the underside of said partition and a water strewing dome body is installed opposite to the end of said nozzle. It is preferable to treat said water strewing dome body with a ferric-ferrous iron to increase the improving effect of said water strewing dome body for water.

Further it is preferable to arrange movably a plural number of balls treated with a ferric-ferrous iron under said blade member to increase further the improving effect of water.

BRIEF DESCRIPTION OF THE DRAWING

FIG. 1 is a perspective view of the overhauled water treating apparatus.

FIG. 2 is a cross sectional view of the water treating apparatus.

FIG. 3 is a perspective view of the inside of the under side cylinder.

FIG. 4 is a perspective view of the blade member.

FIG. 5 is a plane view of the blade member.

FIG. 6 is a cross sectional view along a line A—A in FIG. 1.

FIG. 7 is an enlarged cross sectional view of the nozzle.

FIG. 8 is a perspective view of the water strewing dome body.

FIG. 9 is a perspective view to illustrate the flow of water in the underside of the check valve.

FIG. 10 is a cross sectional view corresponding to FIG. 6.

FIG. 11 is a view to illustrate the flow of water in the underside of the check valve.

DETAILED DESCRIPTION

Figure 1:
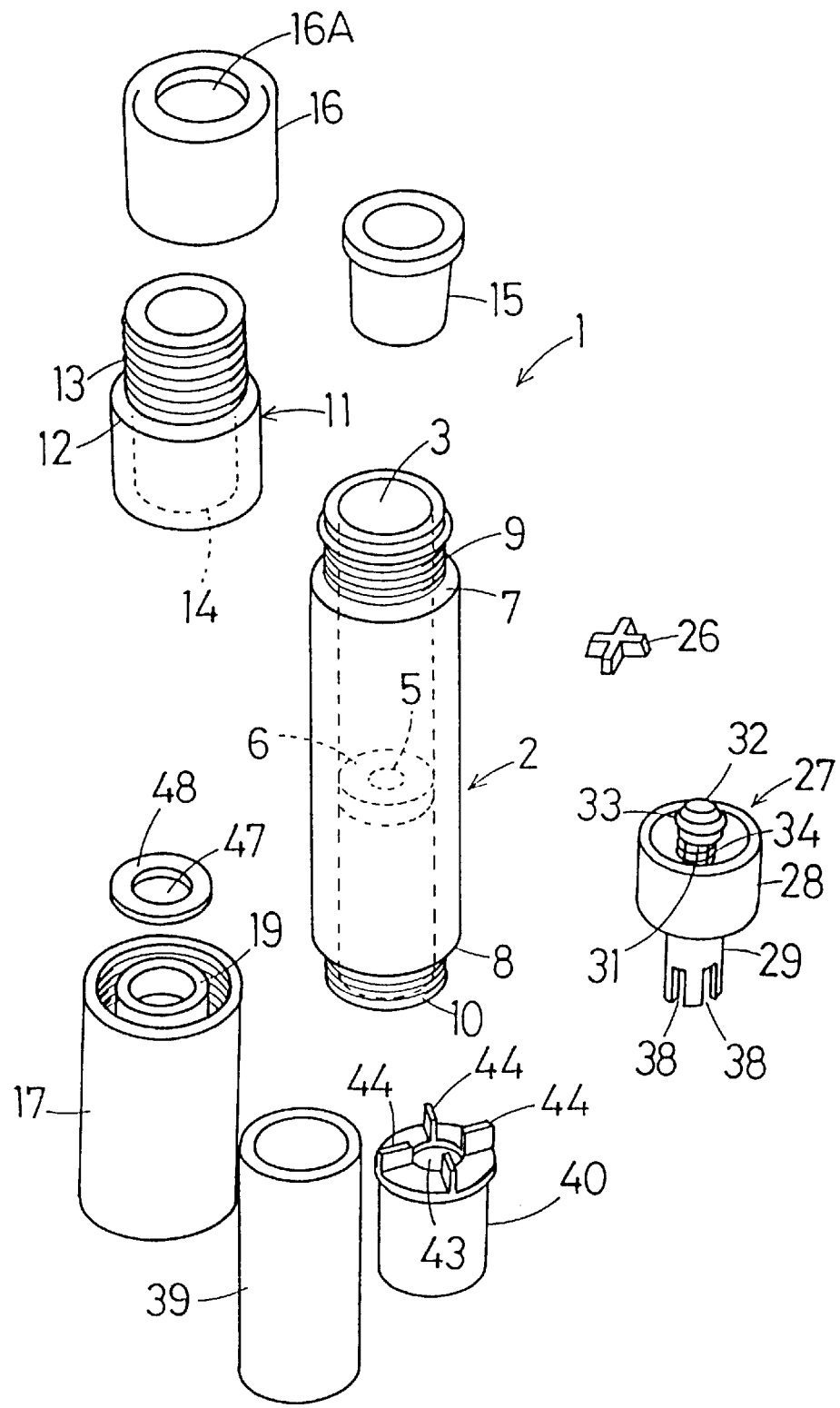
FIG. 1 to FIG. 9 relate to our embodiment of the present invention.
Figure 2:
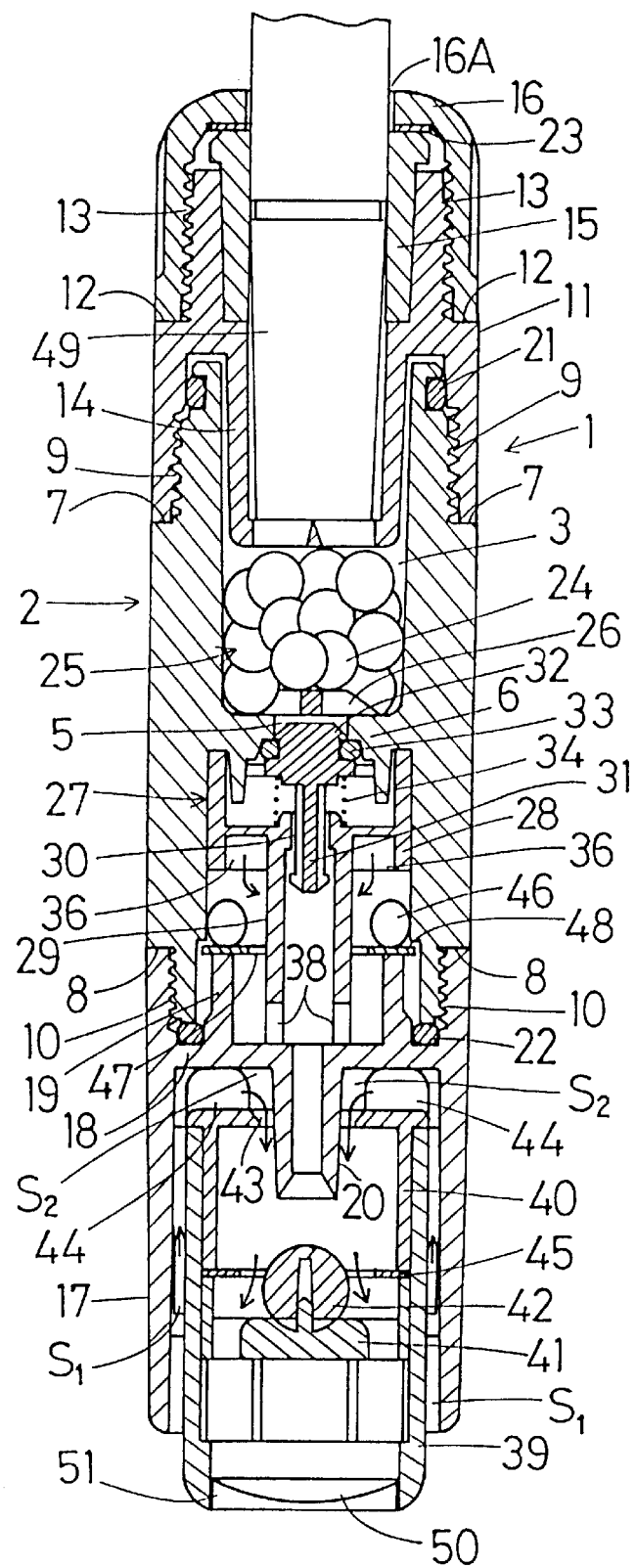

FIG. 1 to FIG. 9 show an embodiment of the present invention. A water treating apparatus (1) shown in FIGURES has a cylindrical body (2) in which a water passage (3) is longitudinally formed and a partition (6) having a center hole (5) to pass water is arranged in the middle of said water passage (3) of said cylindrical body (2) as shown in FIG. 2 and the diameter of the upper and lower end parts of said cylindrical body (2) are respectively reduced to form stair faces (7)(8) and the circumferential surface of said upper and lower end parts are respectively threaded to form screw parts (9)(10). An upper socket (11) and a lower socket (17) are respectively screwed on said screw parts (9) (10).

The diameter of the upper side of said upper socket (11) is reduced to form a stair face (12) and the circumferential surface of said upper side of said upper socket (11) is threaded to form a screw part (13) and a pressing tube (14) is equipped in the lower side of said upper socket (11) as shown in FIG. 2. A packing plug (15) made of a rubber of an elastomer is inserted into the upper end of said upper socket (11) and a cap (16) having a water hole (16A) at the upper end is screwed on the screw part (13) of said upper socket (11) and said packing plug (15) is pressed and fixed by said cap (16).

Figure 3:
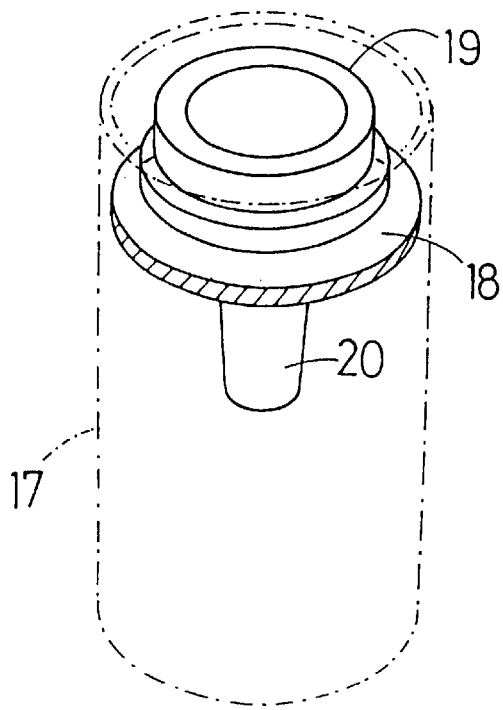

A partition (18) is arranged in the upper side of said lower socket (17) as shown in FIG. 2 and FIG. 3, and in said lower socket (17), a cylindrical flange (19) is formed on said partition (18) and a nozzle (20) is formed from the under side of said partition (18).

As shown in FIG. 2, O-ring (21) intermediates between said cylindrical body (2) and said upper socket (11) and a retainer ring (23) intermediates between said cap (16) and said packing plug (15) to give said water treating apparatus (1) an air-tight structure.

A ceramic filling layer (25) consisting of a large number of ceramic balls (24) is arranged on said partition (6) in said cylindrical body (2) of said water treating apparatus (1) as shown in FIG. 2 and the upper end of said ceramic filling layer (25) is pressed by said pressing tube (14) and further said ceramic filling layer (25) is supported by a cross frame (26) put on said partition (6).

Figure 4:
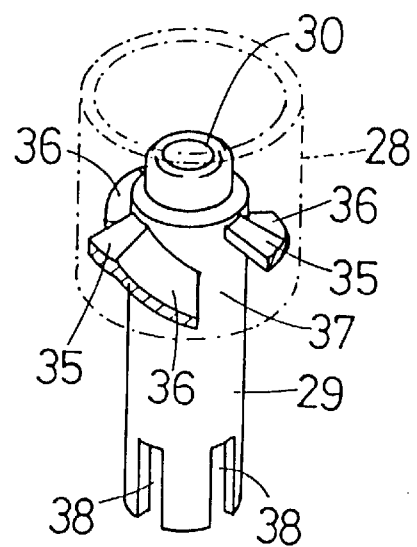
Figure 5:
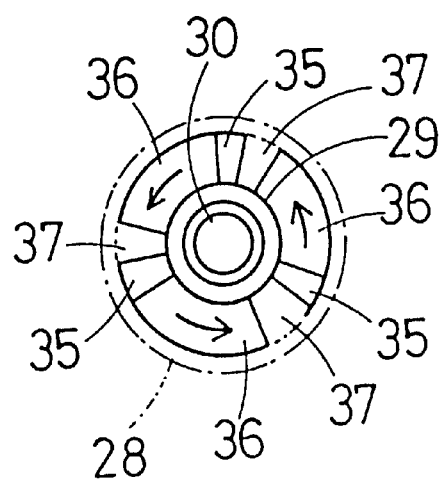

A check valve (27) is arranged under said partition (6) as shown in FIG. 2. Said check valve (27) consists of a valve supporting case (28), a valve rod (31) which slides up and down inserted in a sliding hole (30) formed at the upper end of a center tube (29) of said valve supporting case (28), a valve (32) equipped at the upper end of said valve rod (31), an O-ring (33) attached around said valve (32), and a coil spring (34) pressing said valve rod (31) toward upper side. As shown in FIG. 4, a plural number of spokes (35) are radiately arranged between said center tube (29) and said valve supporting case (28) and a blade (36) slanting toward down side is stretched from the left side of each spoke (35), a blade member (36A) is constructed by said spokes (35) and said blades (36) are in said valve supporting case (28) and in said blade member (36A), spaces (37) are formed between blades (36) neighboring to each other as shown in FIG. 4 and FIG. 5.

Figure 6:
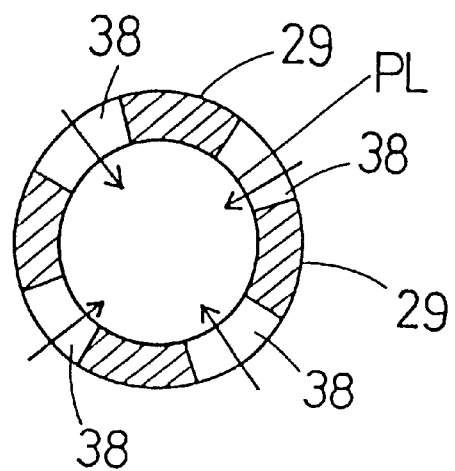

A plural number of longitudinal slits (38) are formed on the circumferential wall of the lower end part of said center tube (29) of said valve supporting case (28) of said check valve (27) and said center tube (29) of said valve supporting case (28) of said check valve (27) is supported on said partition (18) of said lower socket (17). As shown in FIG. 6, each longitudinal slit (38) is centripetally arranged along the normal PL of the circumferential surface of said center tube (29). Further, said valve (32) of said check valve (27) shuts said center hole (5) of said partition (6) of said cylindrical body (2) pressed by said coil spring (34).

Figure 7:
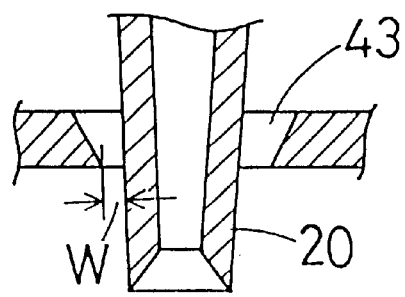

A cylindrical foaming chamber (39) is inserted in the lower side of said lower socket (17) and a space Si is formed between the inside of said lower socket (17) and the outside of said cylindrical foaming chamber (39) as shown in FIG. 2 and an inner cylinder (40) is inserted in the upper side of said cylindrical foaming chamber (39). The width of said space $S_1$ is preferably more than 1.0 mm and the larger width of said space $S_1$ is better. Said nozzle (20) of said partition (18) is inserted in said inner cylinder (40) from the upper side through an inserting hole (43) at the upper end of said inner cylinder (40). Said inserting hole (43) of said inner cylinder (40) has a taper shape reducing its diameter toward the under side and as shown in FIG. 7, the width W between the outside of said nozzle (20) and inside of the lower end of said inserting hole (43) is preferably set to be in the range between 0.5 to 2.0 mm.

Figure 8:
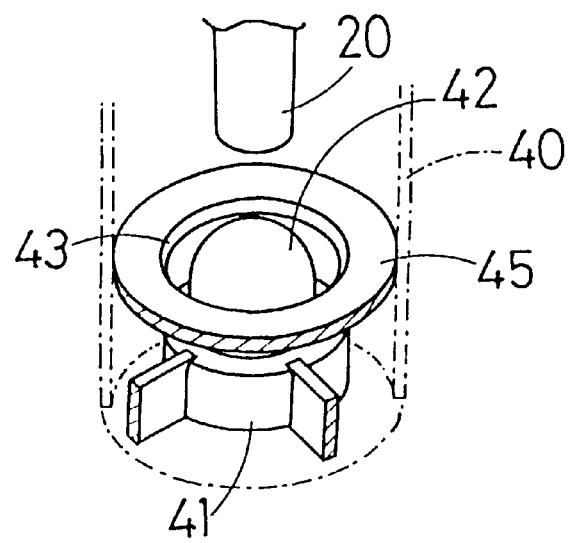

A water strewing dome body (42) supported by a bed frame (41) is installed in the center of the lower part of said inner cylinder (40) as shown in FIG. 8. Said water strewing dome body (42) consists of a mineral ball and is arranged under said nozzle (20) opposing to the end of said nozzle (20) and surrounded by a ring body (45). A plural number of rib spacer (44) are formed on the upper face of said inner cylinder (40) of said cylindrical foaming chamber (39) and as shown in FIG. 2, a space $S_2$ is formed between the upper face of said cylindrical foaming chamber (39) and the under side of said partition (18) of said lower socket (17).

Figure 9:
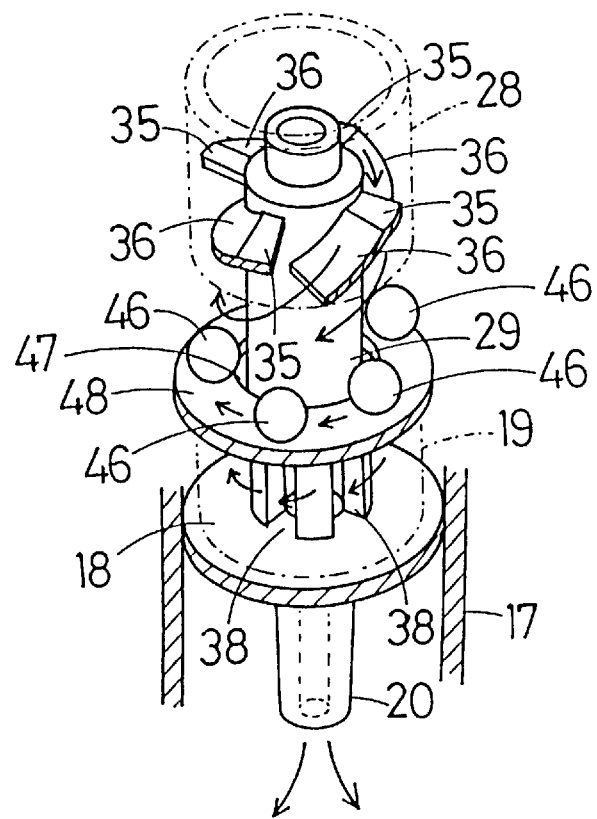

A plural number of balls (46) made of stainless steel, ceramics, and the like are preferably arranged under said check valve (27). As shown in FIG. 9, said balls (46) are supported on a supporting plate (48) having a center hole (47) as a water passage and said supporting plate (48) is put on the upper end of said cylindrical flange (19) of said lower socket (17).

Said ceramic ball (24) is made of, for example, silicon oxide, aluminum oxide, zirconium oxide, titanium oxide, silicon nitride, boron nitride, silicon carbide, and the like and a mixture of two or more kinds of said ceramics also may be used as the material of said ceramic ball (24). A preferable mixture of said ceramics is, for example, a mixture of silicon oxide and aluminum oxide and said ceramic ball (24) is preferably treated by a ferric-ferrous iron. To treat said ceramic ball with said ferric-ferrous iron, said ceramic ball is dipped in a solution of said ferric-ferrous iron or said ceramic ball is contacted with air which passed through said solution of said ferric-ferrous iron.

The above-said ferric-ferrous iron solution is prepared as follows:

1 g of ferric chloride is added to 5 ml of 12N caustic soda aqueous solution and stirred. The dissolved solution is kept for 5 or more hours at room temperature. Said solution is neutralized at about pH7 by 12N aqueous HCl. The neutralized solution is filtered by filter paper (No. 5C) and concentrated in vacuum to obtain crystal. Crystal is vacuum-dried in a desiccator. The resulting dried material is added to 10 ml of mixed solvent of isopropanol and water (80:20 weight ratio). The resulting solution is filtered by filter paper (No. 5C) and vacuum-concentrated. After removing the solvent, crystal is dried. The above-said process of extraction, concentration and drying is continued several times to obtain fine crystal of activated iron chloride. 2 ppm solution is prepared by diluting said crystal with distilled water.

1 g of ferrous sulfate is added to 5 ml of 12N HCl aqueous solution and stirred. The dissolved solution is filtered by filter paper (No. 5C) and then vacuum-concentrated to obtain crystal. Crystal is vacuum-dried in a desiccator. The resulting solution is filtered by filter paper (No. 5C) and vacuum-concentrated. After removing the solvent, crystal is dried. The above-said process of extraction, concentration and drying is continued several times to obtain fine crystal of activated iron chloride. 2 ppm solution is prepared by diluting said crystal with distilled water.

Further, said balls (46) arranged under said check valve (27) are preferably treated with said ferric-ferrous iron in the same way as said ceramic ball (24). Still further, said mineral material used as the material of said water strewing dome body (42) is, for example, crystal, quartz, feldspar, jade and the like, and said mineral material is preferably treated with said ferric-ferrous iron in the same way as said ceramic ball (24).

Further, a plural number of nets (50) piled together are arranged at the lower end of said cylindrical foaming chamber (39). Said water treating apparatus (1) is attached to, for example, the faucet (49) of the water pipe as shown in FIG. 2 and the city water is introduced into said water treating apparatus (1) through said faucet (49). First, chlorinated material in said city water is removed by letting it pass through said ceramics filling layer (25) and the valve (32) of said check valve (27) is pushed down by the pressure of said water and said water is introduced into said valve supporting case (28) and then said water is revolved by blades (36) of said blade member (36A) in said valve supporting case (28) as shown by arrows in FIG. 5 and FIG. 9 and further, effected by shear force to chop clusters of said water into finer clusters. If said water flows upstream by colliding to said blades (36) of said blade member (36A) in said valve supporting case (28), said valve (32) of said check valve (27) may shut said center hole (5) of said partition (6) pushed by said coil spring (34) to prevent said water from flowing upstream into said ceramic filling layer (25).

As above described, said water is revolved and chopped to form finer clusters and passes through spaces (37) between blades (36) to flow into the upper side of said lower socket (17) and said revolving water contacts with balls (46) supported on said supporting plate (48) shown by the arrow in FIG. 9. By said revolving water, said balls (46) move as shown by arrows in FIG. 9 and said water further closely contacts with said balls (46) to remove further chlorinated materials and the clusters are further chopped to be very finer clusters, thus said water treated above described flows to the under side of said supporting plate (48) through the space between the outside of said center tube (29) and the inside of said center hole (47) of said supporting plate (48) and said water is introduced to said nozzle (20) of said lower socket (17) through said longitudinal slits (38) of said center tube (29) as shown in FIG. 6 being spouted toward said water strewing dome body (42) from said nozzle (20).

When said water is spouted from said nozzle (20), air is sucked into said cylindrical foaming chamber (39) through the space Si between the outside of said cylindrical foaming chamber (39) and the inside of said lower socket (17) and the space $S_2$ between the upper side of said cylindrical foaming chamber (39) and the under side of said partition (18) of said lower socket (17) and further the space between the outside of said nozzle (20) and the inside of said inserting hole (43) of said inner cylinder (40) of said cylindrical foaming chamber (39). As above described, when the space $S_1$ between the outside of said cylindrical foaming chamber (39) and the inside of said lower socket (17) is set to be larger than 1.0 mm, air may smoothly pass through said space $S_1$. Further, when said inserting hole (43) of said inner cylinder (40) has a taper shape reducing its diameter toward the under side and the space between the outside of said nozzle (20) and the inside of the lower end of said inserting hole (43) is set to be in the range between 0.5 to 2.0 mm, the sucking speed of air is effectively accelerated.

Said water spouted from said nozzle (20) collides to said water strewing dome body (42) to be radially sprinkled and foams are formed by mixing air sucked into said cylindrical foaming chamber (39) to remove the chlorinated material and the like and further said water is filtered by said plural number of nets (50) of said cylindrical foaming chamber (39). After the filtration by said plural number of nets (50), said water is spouted from the water outlet (51) and foams in said water are crushed by the spouting pressure to generate anion. The number of said generated anion is in the range of 12000 to 14000/cm$^3$ by Lenard effect.

Water before treatment by said water treating apparatus is titrated by the chlorine detecting agent and as a result, chlorine is detected in said water while no chlorine is detected by the same titration test. Further, the sizes of the clusters of water before and after treatment are respectively detected by $^{17}$O-NMR spectral analysis and the results are that O-NMR spectral line width as an indicator of the size of the cluster before treatment is 93.4 Hz, while O-NMR spectral line width after treatment is 65.1 Hz.

Figure 10:
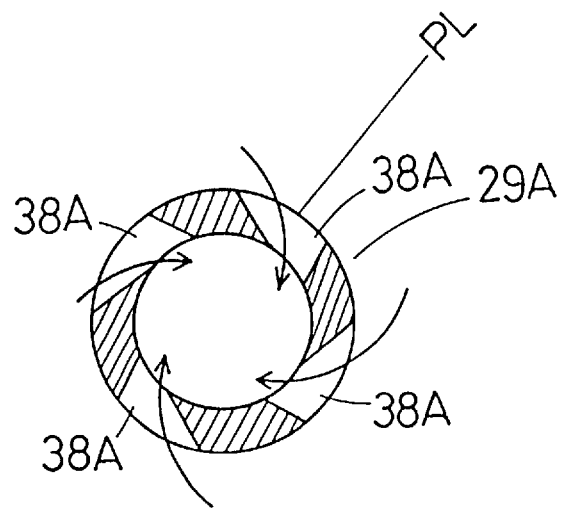
FIG. 10 and FIG. 11 relate to another embodiment of the present invention.
Figure 11:
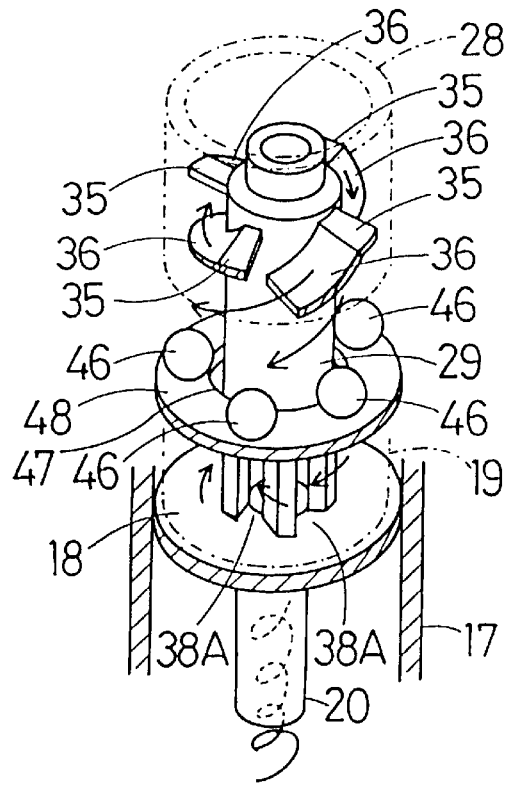
Figure 12:
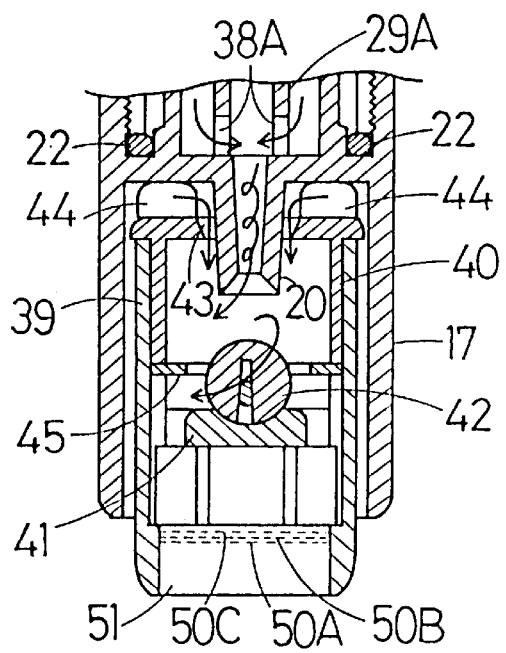
FIG. 12 is a cross sectional view of the foaming cylinder of another embodiment.

FIG. 10 and FIG. 11 show another embodiment of the present invention. In this embodiment, slits (38A) of a center tube (29A) of said check valve (27) is arranged slanting from the normal PL of the circumferential surface of said center cylindrical body (29A) as shown in FIG. 10 to give said water revolving force shown by an arrow in FIG. 11 when said water is introduced to said nozzle (20) and then said water is spouted toward said water strewing dome body (42) with revolving. Accordingly, the clusters of said water are further finely chopped and the $^{17}$O-NMR spectral line width of the clusters after treatment is 60.4 Hz in this embodiment.

Further in the present invention, a plural number of (three sheets of) nets (50A, 50B, 50C) piled together may be arranged in the water outlet (51) of the cylindrical foaming chamber (39). A size of mesh of said nets (50A, 50B, 50C) is generally set to be in the range between 0.25 to 1.0 mm$^2$. By passing water through said nets, the clusters of water are further chopped into finer clusters. In this case, $^{17}$O-NMR spectral line width after passing through said nets is 59.8 Hz.

The scope of the present invention is not limited to the above described embodiments. For instance, ceramic chips may be used instead of ceramic balls in said ceramic filling layer. Further, said check valve and said blade member may be separated from each other. Still further, said water strewing dome body may have a pyramid shape, a cone shape, and the like.

In the present invention, water has very fine clusters and contains substantially no chlorinated materials and as a result, water having a preferable taste and bioactivity is easily obtained.

What is claimed is:

1. A water treating apparatus comprising, a cylindrical body having a water inlet at an upper end and a water outlet at a lower end wherein a water passage is longitudinally formed in said cylindrical body, a blade member is arranged in said cylindrical body and gives water passing through in said water passage revolution force and shear force, a partition is formed under the blade member, and a nozzle is attached from the center of an underside of said partition and a water strewing dome body is installed opposing to an end of said nozzle.

2. A water treating apparatus in accordance with claim 1 wherein said blade member has a plural number of blades radiately arranged from the center of said blade member and slanted from an upper side to a lower side to give water revolution force and shear force and spaces are formed between blades adjacent to each other.

3. A water treating apparatus in accordance with claim 1 wherein a center cylindrical body is arranged between the center of said blade member and said partition and a plural number of slits being opened to said nozzle are formed at the lower end of said center cylindrical body.

4. A water treating apparatus in accordance with claim 3 wherein each slit is centripetally arranged along the normal of the circumferential surface of said center cylindrical body.

5. A water treating apparatus in accordance with claim 3 wherein each slit is arranged slanting from the normal of the circumferential surface of said center cylindrical body.

6. A water treating apparatus in accordance with claim 1 wherein said water strewing dome body is installed in a cylindrical foaming chamber, an inserting hole whose diameter is reduced toward the underside is formed at the upper end of said cylindrical foaming chamber, and said nozzle is inserted into said cylindrical foaming chamber through said taper hole opposing to said water strewing dome body.

7. A water treating apparatus in accordance with claim 6 wherein the space between the inside of the lower end of said inserting hole of said cylindrical foaming chamber and the outside of said nozzle is set to be in the range between 0.5 to 2.0 mm.

8. A water treating apparatus in accordance with claim 1 wherein said water strewing dome body is made of a mineral material treated with a ferric-ferrous iron.

9. A water treating apparatus in accordance with claim 1 wherein a partition having a center hole to pass water is arranged above said blade member in said water passage of said cylindrical body, and a check valve is equipped in said center hole.

10. A water treating apparatus in accordance with claim 1 wherein a ceramic filling layer is arranged in said water passage of said cylindrical body.

11. A water treating apparatus in accordance with claim 10 wherein said ceramic filling layer consists of a large number of ceramic balls treated with a ferric-ferrous iron.

12. A water treating apparatus in accordance with claim 1 wherein a plural number of balls treated within ferric-ferrous iron are movably arranged under said blade member.

13. A water treating apparatus in accordance with claim 1 wherein a plural number of nets piled together are arranged close to the water outlet.

14. A water treating apparatus in accordance with claim 13 wherein each net has mesh having a size between 0.25 and 1.0 mm$^2$.

* * * * *